(12) United States Patent
Weihl

(10) Patent No.: US 9,487,193 B2
(45) Date of Patent: Nov. 8, 2016

(54) VEHICLE CONTROL SYSTEM

(71) Applicant: Hurricane, Inc., Muskegon, MI (US)

(72) Inventor: Ricky A. Weihl, Muskegon, MI (US)

(73) Assignee: Hurricane, Inc., Muskegon, MI (US)

( * ) Notice: Subject to any disclaimer, the term of this patent is extended or adjusted under 35 U.S.C. 154(b) by 0 days.

(21) Appl. No.: 14/633,644

(22) Filed: Feb. 27, 2015

(65) Prior Publication Data

US 2016/0251003 A1    Sep. 1, 2016

(51) Int. Cl.
  *B60T 7/12*   (2006.01)
(52) U.S. Cl.
  CPC ........................................ *B60T 7/12* (2013.01)
(58) Field of Classification Search
  CPC ........ G05G 11/00; G05G 17/00; E01H 1/08; E01H 15/00; A47L 5/28; B60T 7/12
  See application file for complete search history.

(56) References Cited

U.S. PATENT DOCUMENTS

| | | | | |
|---|---|---|---|---|
| 3,898,891 | A * | 8/1975 | Colloton | B60K 23/00 180/336 |
| 5,924,516 | A * | 7/1999 | Sagaser | E02F 9/2004 137/625.65 |
| 6,434,917 | B1 * | 8/2002 | Bartel | A01D 34/64 180/286 |
| 6,739,116 | B2 * | 5/2004 | Stover | A01D 69/10 56/11.3 |
| 7,634,953 | B2 | 12/2009 | Hoffman et al. | |
| 7,841,044 | B1 | 11/2010 | Weihl et al. | |
| 8,794,660 | B1 * | 8/2014 | Stover | A01D 34/824 16/110.1 |
| 2004/0159100 | A1 * | 8/2004 | Bernard | B64C 13/12 60/325 |
| 2006/0169509 | A1 * | 8/2006 | Iida | B60K 31/06 180/170 |
| 2006/0174601 | A1 * | 8/2006 | Piontek | A01D 34/64 56/11.3 |
| 2007/0262637 | A1 * | 11/2007 | Bennett | B60T 13/662 303/3 |
| 2009/0015203 | A1 * | 1/2009 | Oakes | G06Q 40/00 320/132 |
| 2012/0178575 | A1 * | 7/2012 | Mueller | B60K 17/35 475/150 |
| 2014/0256509 | A1 * | 9/2014 | Cousins | F02N 11/0807 477/99 |
| 2015/0309717 | A1 * | 10/2015 | Sinaguinan | G01C 21/3688 701/538 |

* cited by examiner

*Primary Examiner* — Jerrah Edwards
*Assistant Examiner* — Tamara Weber
(74) *Attorney, Agent, or Firm* — Warner Norcross & Judd LLP

(57) ABSTRACT

A control system for a vehicle having a drive system, the drive system having a forward drive mode, a reverse drive mode, and a neutral mode. The control system may include an operator control operable by the vehicle user to control whether the vehicle is in a drive mode or a neutral mode. The control system may be configured, based on whether the vehicle operator is actively controlling the operator control, to automatically engage/disengage a vehicle brake, detect operator presence or absence and provide neutral lockout for preventing starting of the vehicle engine.

12 Claims, 13 Drawing Sheets ated with reliability and increased power is a hydrostatically
VEHICLE CONTROL SYSTEM

TECHNICAL FIELD

The present application relates to an operator control system for a vehicle, and more particularly to an operator control system capable of controlling multiple vehicle functions.

BACKGROUND

Controls in some form or another are included in nearly every vehicle to allow a user or vehicle operator to direct operation of the vehicle. Common to most vehicles are several controls: steering control, drive control, and braking control. Using these individual controls, a vehicle operator may steer the vehicle in a desired direction, control forward or reverse movement, accelerate or decelerate the vehicle, and stop the vehicle. Additional, separate controls in one form or another have also been incorporated into vehicles. Examples of such controls include emergency braking, lighting, and transmission gear selection.

One type of vehicle that has become prevalent for its enhanced reliability and increased power is a hydrostatically powered vehicle. This vehicle type includes a hydrostatic transmission or hydraulic drive system to provide forward and reverse motion. Conventional hydraulic drive systems use pressurized hydraulic fluid to drive a hydraulic motor, which converts the hydraulic pressure and flow into torque and angular displacement. In many cases, unlike the combination of an internal combustion engine and a geared transmission often times used in passenger vehicles, conventional hydrostatic transmissions do not utilize a gearbox. To the vehicle operator, this may mean there is no need to select gears or operate a clutch, thereby simplifying operation of the vehicle.

Steering and speed control in conventional hydrostatically powered vehicles are accomplished by independently powered drive wheels on each side of the vehicle. One drive wheel may be operated in one direction at one speed while the other wheel is operated differently, such as at a different speed or a different direction, or both. This may cause the vehicle to turn in a desired direction. To control the independent operation of the drive wheels, the vehicle is often times fitted with one or more control levers that the vehicle operator can move independently to control the speed and direction of each wheel.

Dual control levers or twin stick controls may be provided in proximity to each other, with each lever or stick controlling one of the drive wheels. Advancing both levers together in a forward direction from a neutral position may result in both drive wheels rotating to provide forward motion. Further advancing each lever forward increases the drive speed of the respective wheel. Conversely, moving each lever back toward the neutral position from the forward position decreases the drive speed of the respective wheel. Advancing both levers together in a reverse direction from the neutral position (or toward the vehicle operator) may result in both drive wheels rotating to provide reverse motion. Similar to moving the levers forward, the amount of displacement of each lever from the neutral position may correspond to the speed of the respective wheel.

Although a hydrostatic vehicle with dual control levers is typically configured to remain motionless while both control levers are in the neutral position, unwanted motion may occur due to inadvertent movement of the levers, or due to improper calibration of the hydrostatic transmission. As an added precaution against unwanted motion, conventional hydrostatically powered vehicles include a separate manual brake that, when set, actively prevents motion of the vehicle. To set the separate manual brake in a conventional hydrostatically powered vehicle, the vehicle operator first releases one or both of the control levers, and then actuates the manual brake to prevent motion of the vehicle. During this time, one or both of the control levers are out of the vehicle operator's control, thereby creating a circumstance in which unwanted motion could occur. Additionally, unwanted motion could also occur if the vehicle operator forgets to set the manual brake.

Another feature that has been introduced to conventional hydrostatic vehicles to enhance safety is a separate neutral lockout. The neutral lockout prevents starting of the vehicle if the controls are not in the neutral position. In this way, the vehicle can be prevented from moving in response to starting when the control levers are likely not under control by the vehicle operator.

Yet another feature common to many hydrostatic vehicles is operator presence detection. Conventionally, operator presence detection is achieved by using a sensor or switch sensitive to weight or force applied to the operator's seat or pedestal. Presence or absence of the operator can be determined based on whether the operator's weight is detected on the seat or pedestal. For example, if the operator's weight is detected on the seat or pedestal, the vehicle may allow starting, and continue running. Once the operator's weight is no longer detected, the vehicle may disable operation. As can be seen, this functionality is dependent on weight of the operator, and use of additional sensors or switches separate from the vehicle controls.

SUMMARY OF THE DESCRIPTION

The present disclosure describes a control system for a vehicle having a drive system, the drive system having a drive mode and a neutral mode. The control system may direct the drive system of the vehicle to operate in the drive mode or the neutral mode, and may enable a vehicle operator to steer the vehicle and to adjust a vehicle speed. The control system may include an operator control operable by the vehicle user to control whether the vehicle is in the drive mode or the neutral mode. The control system may be configured to engage a vehicle brake that substantially prevents the drive system from causing the vehicle to move. The control system may also, based on whether the operator control is being actively controlled, automatically (a) return the vehicle to the neutral mode and the lockout mode or (b) engage the vehicle brake, or both.

In one embodiment, the control system may include operator presence detection that prevents movement of the vehicle unless the vehicle operator is present. For example, the vehicle brake of the vehicle may be engaged, preventing forward and reverse movement unless the vehicle operator is in control of the operator control. The operator control in one embodiment may include two controls capable of being pivoted by the vehicle operator from a neutral lockout position to a drive position. Operator presence detection may be tied to the position of the two controls such that, in the neutral lockout position, the vehicle operator is considered not present, and in the drive position, the vehicle operator is considered present. The two controls may automatically return to and stay in the neutral lockout position when the vehicle operator is not actively holding the two controls in the drive position. In one embodiment, the vehicle may disable starting of the drive system if the operator control is not in the neutral lockout position.

In one embodiment, the drive system may be operable in a reverse mode in which the driven direction of the independently driven wheels causes the vehicle to move backwards or in reverse. The operator control of the integrated control system may be positioned in a reverse position corresponding to the reverse mode. Like the forward position, further advancing the operator control from the neutral position causes the speed of the vehicle to increase, and advancing the operator control toward the neutral position causes the speed of the vehicle to decrease. Based on the vehicle operator releasing the operator control, the operator control may automatically move to the neutral position and engage the vehicle brake.

A control system according to one embodiment of the present invention may enable a user to independently control at least two drive wheels of a vehicle with enhanced safety. The operator control or controls of the integrated control system may automatically operate a drive system of the vehicle to substantially cease driving the vehicle based on the user releasing the operator control. The control system may also automatically engage a vehicle brake based on the user releasing the operator control. In this way, a vehicle brake may be engaged by the user without releasing either of their hands from the operator control to actuate a separately operated brake. To further enhance safe operation of the vehicle, the integrated control system may include a neutral lockout and operator presence detection. An integrated control system having independent drive wheel control, automatic neutral and brake engagement, neutral lockout, and user presence detection may substantially prevent the vehicle from operating during circumstances in which the user is not in full control of the vehicle.

These and other advantages and features of the invention will be more fully understood and appreciated by reference to the description of the current embodiments and the drawings.

DESCRIPTION

Figure 1:
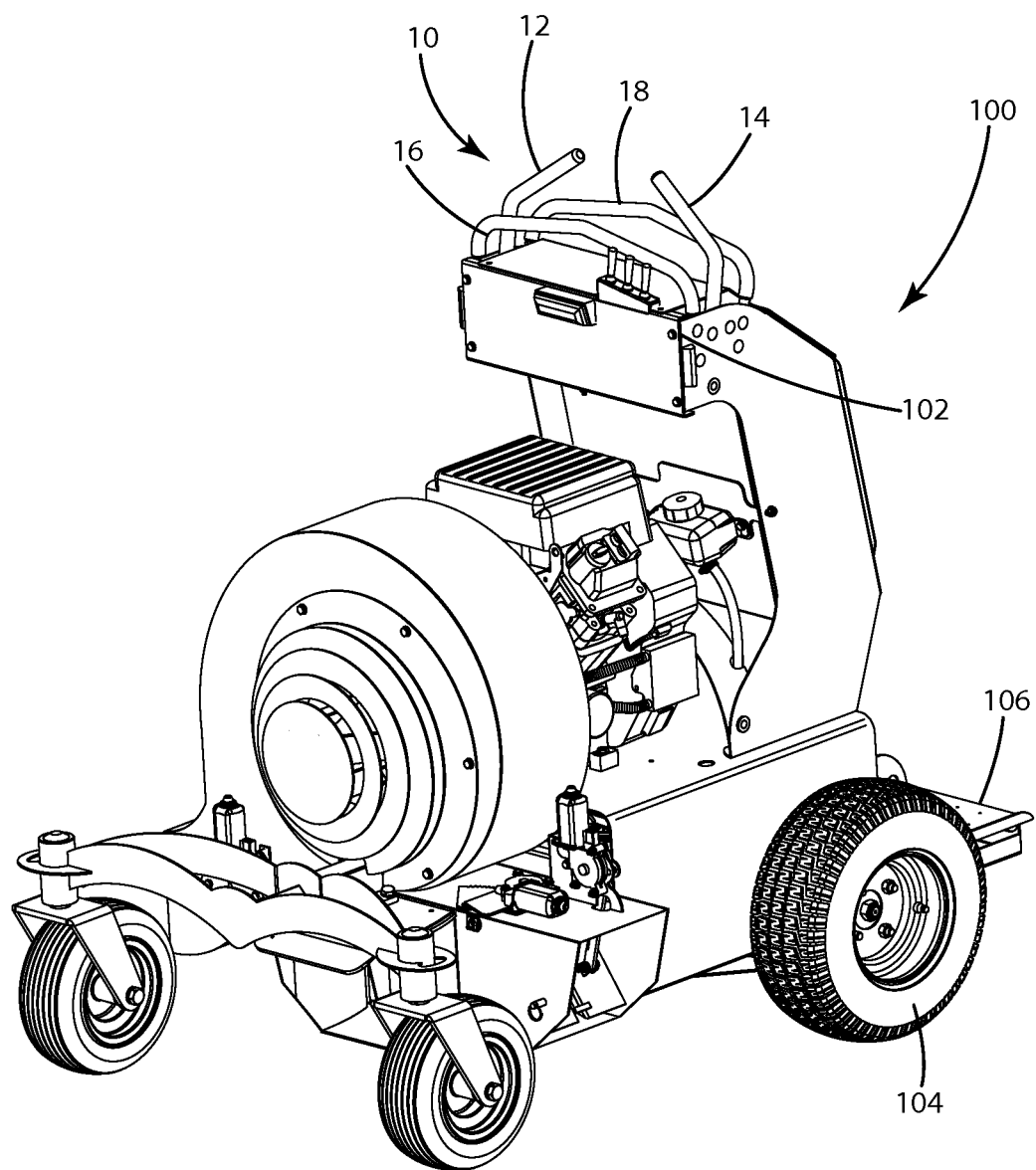
FIG. 1 shows a vehicle with an integrated control system according to one embodiment of the present invention.

Before the embodiments of the invention are explained in detail, it is to be understood that the invention is not limited to the details of operation or to the details of construction and the arrangement of the components set forth in the following description or illustrated in the drawings. The invention may be implemented in various other embodiments and of being practiced or being carried out in alternative ways not expressly disclosed herein. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof. Further, enumeration may be used in the description of various embodiments. Unless otherwise expressly stated, the use of enumeration should not be construed as limiting the invention to any specific order or number of components. Nor should the use of enumeration be construed as excluding from the scope of the invention any additional steps or components that might be combined with or into the enumerated steps or components.

A vehicle having a control system in accordance with one or more embodiments of the present invention is shown in FIG. 1, and is generally designated 100. As set forth below, the control system may implement a variety of features, including one or more of the following: neutral lockout, operator presence detection, automatic brake engagement, and steering and drive control. Although described in connection with a hydrostatic vehicle, particularly a hydrostatically powered debris blower, it should be understood that the features described herein are not limited to such a vehicle, and that any type of vehicle may be constructed according to one or more embodiments described herein. It also should be understood that the one or more embodiments described herein may be configured differently, and that one or more components or features from one embodiment may be included in another embodiment, and that, additionally or alternatively, one or more components or features may be absent from any embodiment described herein.

Referring now to the illustrated embodiment of FIG. 1, the vehicle 100 may include a vehicle control interface 10, drive wheels 104, and an operator platform 106. Portions of the vehicle control interface 10 may form part of or operate in conjunction with a control system according to one or more embodiments described herein. The vehicle 100 may further include a vehicle shroud 102 that covers some or all aspects of an electronic control system 200, right and left control assemblies, and a brake control assembly. Although depicted with an operator platform 106, for purposes of disclosure, the vehicle 100 may include any type of structure for supporting a vehicle operator while operating the vehicle 100. Further, the vehicle shroud 102 may also be absent or configured differently depending on the application.

In the illustrated embodiment of FIG. 1, the drive wheels 104 are mechanically coupled to a hydrostatic drive (not shown). The hydrostatic drive in the illustrated embodiment includes a vehicle engine and two separate hydrostatic transaxles capable of independently driving the drive wheels 104 in forward or reverse directions, and at varying speeds. It should be understood that any type of drive system may be utilized, including, for example, a single dual axle hydrostatic transaxle.

Figure 2:
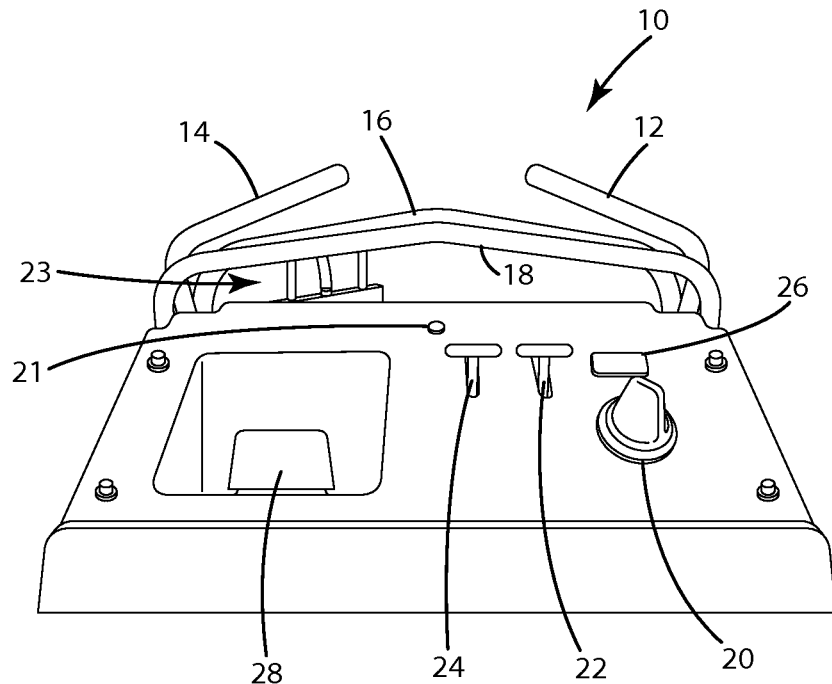
FIG. 2 shows a vehicle control interface according to one embodiment showing an operator control in a lockout position.
Figure 4A:
FIGS. 4A-G are representative views of an operator control being positioned to control steering direction and speed of a vehicle according to one embodiment.
Figure 4B:
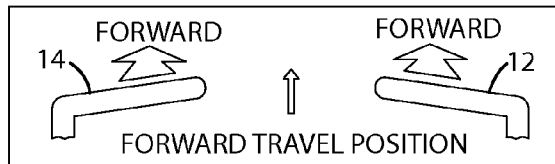
Figure 4C:
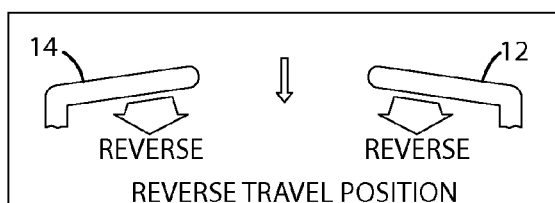
Figure 4D:
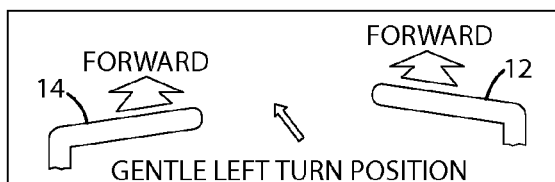
Figure 4E:
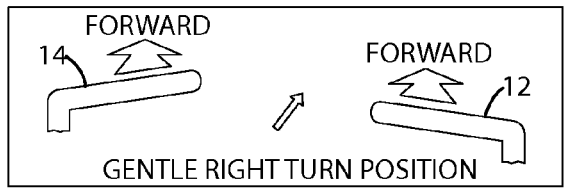
Figure 4F:
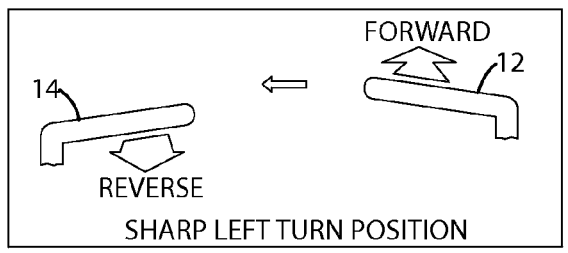
Figure 4G:
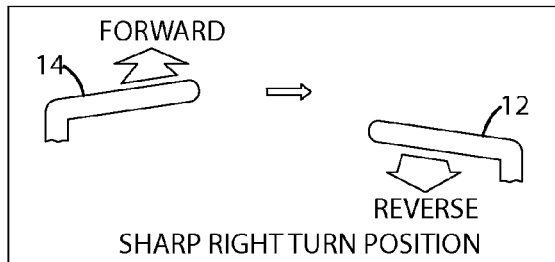

The vehicle control interface 10 depicted in FIG. 1 is shown in further detail in the illustrated embodiment of FIG. 2. The vehicle control interface 10 includes an operator control, which, in the illustrated embodiment, is formed by a right control lever 12 and a left control lever 14. The right and left control levers 12, 14 may be separately linked to each of the hydrostatic transaxles providing independent control over the hydrostatic transaxles, thereby independently controlling operation of drive wheels 104. With this configuration, using the right and left control levers 12, 14, the vehicle operator can steer the vehicle and control the vehicle speed. For example, moving the right control lever 12 forward while holding the left control lever 14 in place may cause the hydrostatic transaxle coupled to the right drive wheel to turn forward faster than the left drive wheel such that the vehicle 100 turns left. The illustrated embodiments of FIGS. 4A-G depict various positions of the right and left control levers 12, 14, and the corresponding effect of those positions, including positions to make hard or gentle left and right turns. A neutral position for the right and left control levers 12, 14 is also shown in FIG. 4A. The right and left turns depicted by the positioning of the control levers 12, 14 in FIGS. 4F and 4G can be described in the context of the vehicle 100 having a zero turn radius.

The vehicle control interface 10 may include a variety of additional features to control or aid in controlling operation of the vehicle 100. For example, as shown in the illustrated embodiment of FIG. 2, the vehicle control interface 10 includes a forward handle bar 16 and a reverse handle bar 18 that provide hand rests for the vehicle operator. The vehicle control interface 10 may include an ignition switch 20 that allows the vehicle operator to start the vehicle engine, to keep the engine running, and to turn off the engine or vehicle power, or both. For example, the ignition switch 20 may include at least two throws or positions other than open, one of which enables power to be supplied to the vehicle 100, and the other of which is momentary to start the vehicle engine. For purposes of disclosure, the ignition switch 20 is described in connection with two throws, but it should be understood that additional throws or switch positions may be included to provide alternative or additional functionality.

Additional examples of features provided by the vehicle control interface 10 may include a throttle 22 for controlling engine speed, a choke 24 for controlling air intake and the air/fuel ratio, a tachometer/hour meter 26, and an oil alert indicator 21 for alerting the vehicle operator to potential oil usage issues. The vehicle control interface 10 may also include vehicle operation controls 23, which in the illustrated embodiment of FIGS. 1 and 2, enable the vehicle operator to control operation of the debris blower. As mentioned above, the present invention is not limited to a vehicle 100 fitted with a debris blower. Other features, such as a mower or a hydraulic actuator, may be implemented in addition or alternatively to the debris blower, and the vehicle operation controls 23 may be configured accordingly to provide control over these features. As shown, a fuel fill opening 28 is also provided near the vehicle control interface 10. Alternatively, the fuel fill opening 28 may be positioned elsewhere on the vehicle 100.

Figure 3:
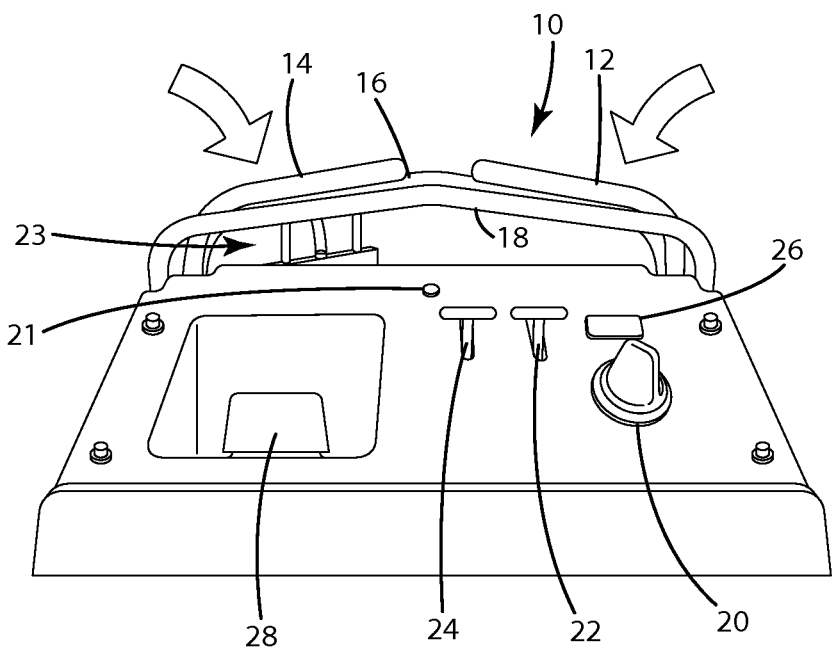
FIG. 3 depicts the vehicle control interface according to one embodiment showing the operator control in a vehicle drive position.

Turning to the illustrated embodiment of FIG. 3, the operator control of the vehicle interface 10 described in connection with FIG. 2 is shown. In the illustrated embodiment, the operator control has been transitioned from the lockout position, shown for example in FIG. 2, to a drive position in which the left and right vehicle control levers 12, 14 are pivoted down and inward. In other words, as can be seen by comparing FIGS. 2 and 3, the left and right vehicle control levers 12, 14 are movable between two positions: (1) the lockout position shown in FIG. 2 and (2) the drive position shown in FIG. 3. As described herein, the right and left control levers 12, 14 may be moved forward and back to control vehicle direction and speed while held by the vehicle operator in the drive position. In response to the right and left control levers 12, 14 being released by the vehicle operator or not being held in the drive position, the right and left control levers 12, 14 may independently automatically transition toward the neutral position, if not already located in the neutral position, and tip out or pivot outwardly to the lockout position shown in FIG. 2. It should be understood that the operator control of the vehicle 100 is not limited to this specific construction, and that the operator control may be configured differently while enabling (a) the vehicle operator to move the operator control to a drive position in which steering and speed can be controlled and (b) the operator control to automatically transition to a lockout position when not being held by the vehicle operator in the drive position.

Figure 5:
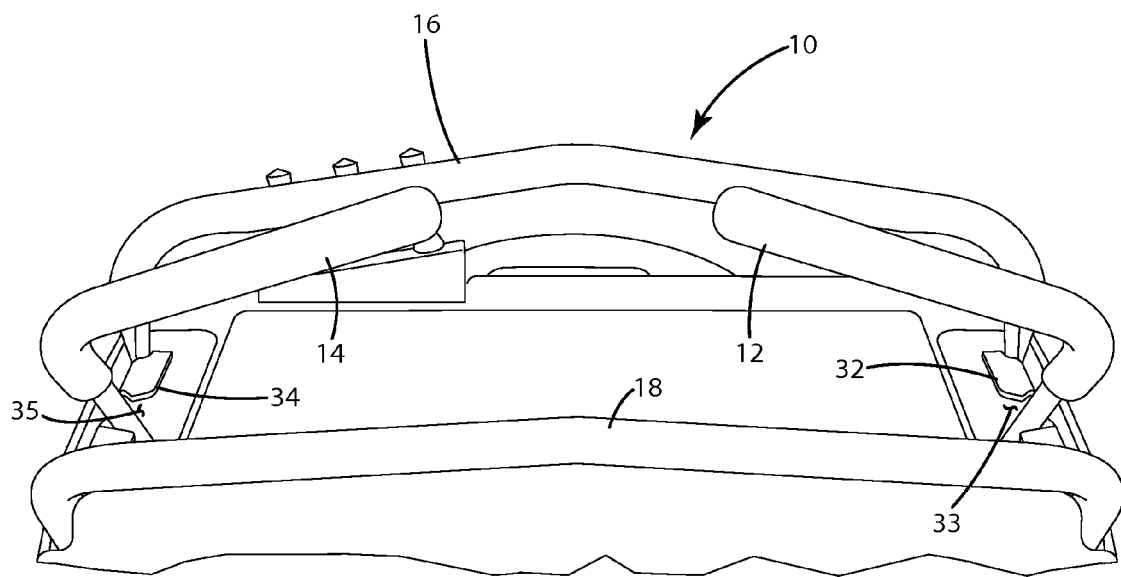
FIG. 5 is a perspective view of a vehicle control interface according to one embodiment showing an operator control in a lockout position.

For purposes of disclosure, one or more embodiments of the right and left control levers 12, 14 and corresponding features directed to automatically returning to a lockout position from a drive position will now be described in connection with the illustrated embodiments of FIGS. 5-11. The vehicle interface 10 described in connection with the illustrated embodiment of FIGS. 1-3 is depicted in FIG. 5, and includes right and left control levers 12, 14 and forward and reverse handlebars 16, 18, respectively. Also shown in the illustrated embodiment of FIG. 5 are right and left neutral centering brackets 32, 34. Each of the right and left control levers 12, 14 may be pivoted inwardly or down to a drive position, and then moved forward or back to direct the hydrostatic drive to control steering and vehicle speed. However, if the vehicle operator releases either the right control lever 12 or the left control lever 14, that control lever may automatically return to the neutral position, and tip outwardly to the lockout position. In other words, absent a vehicle operator actively holding the control levers 12, 14, the control levers 12, 14 return automatically to the neutral and lockout positions. As can be seen in FIG. 5, the control levers 12, 14 are in the lockout position in which the neutral centering brackets 32, 34 prevent forward or backward movement of the control levers 12, 14. More specifically, in the lockout position, the control levers 12, 14 are disposed within a recess 33, 35 (or notch) of each neutral centering bracket 32, 34. The recesses 33, 35 (a) may be aligned with the neutral position of the respective control levers 12, 14, (b) may allow the control levers 12, 14 to tip out or pivot outwardly from the neutral position to the lockout position, and (c) may prevent the control levers 12, 14 from being moved forward or backward, while the control levers 12, 14 are within the recesses 33, 35, in order to prevent the drive wheels 104 from being driven forward or reverse.

Figure 6:
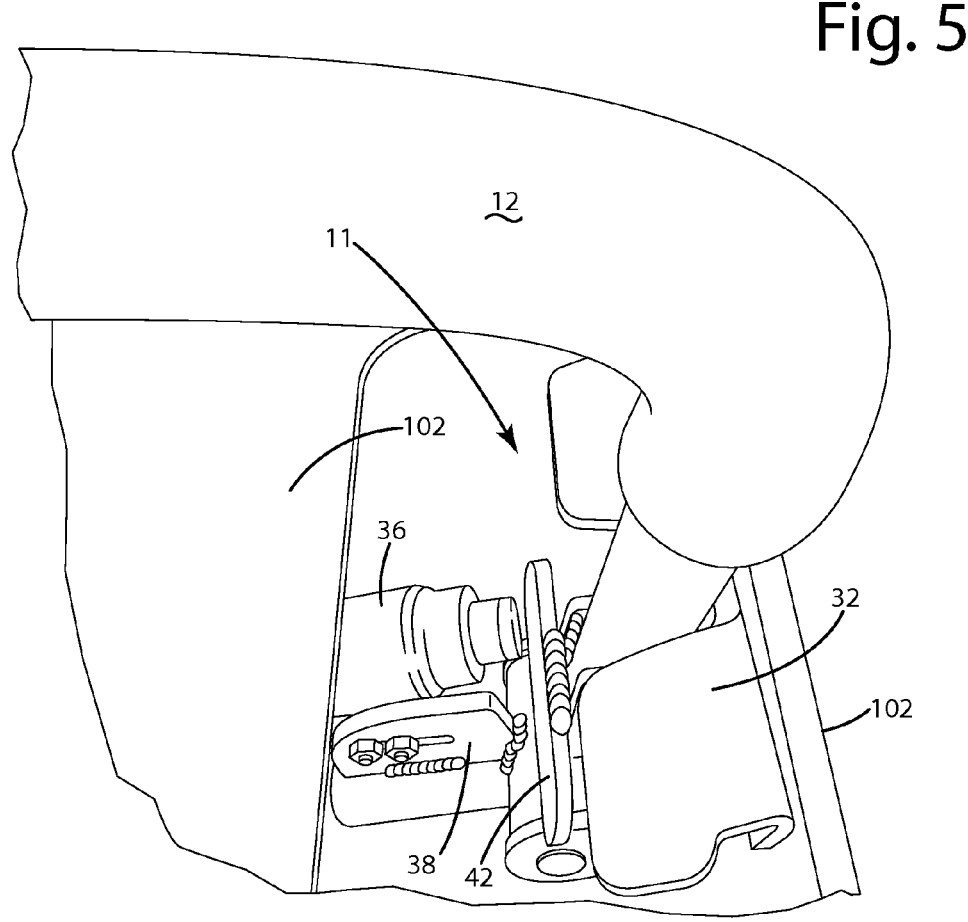
FIG. 6 is a partial perspective view of the operator control construction showing a operator control in a lockout position.
Figure 7:
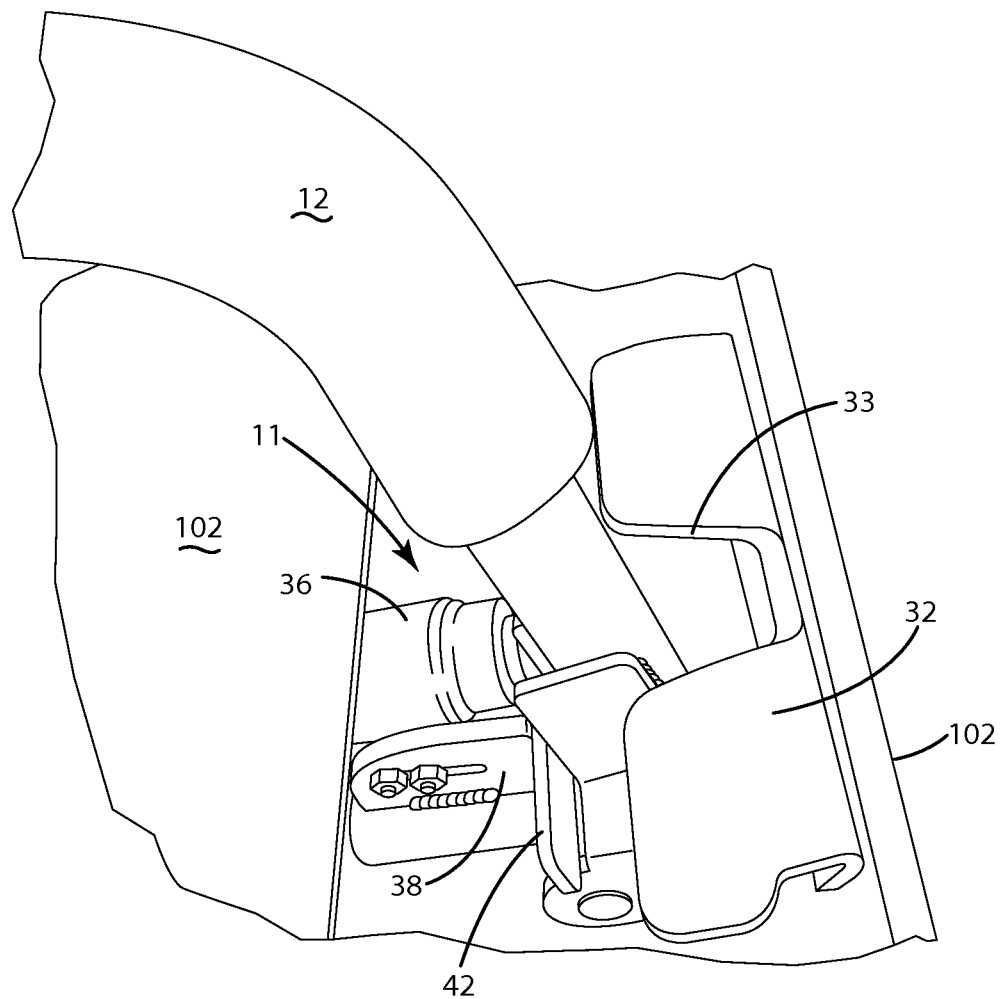
FIG. 7 is a partial perspective view of the operator control construction showing a operator control in a drive position.
Figure 8:
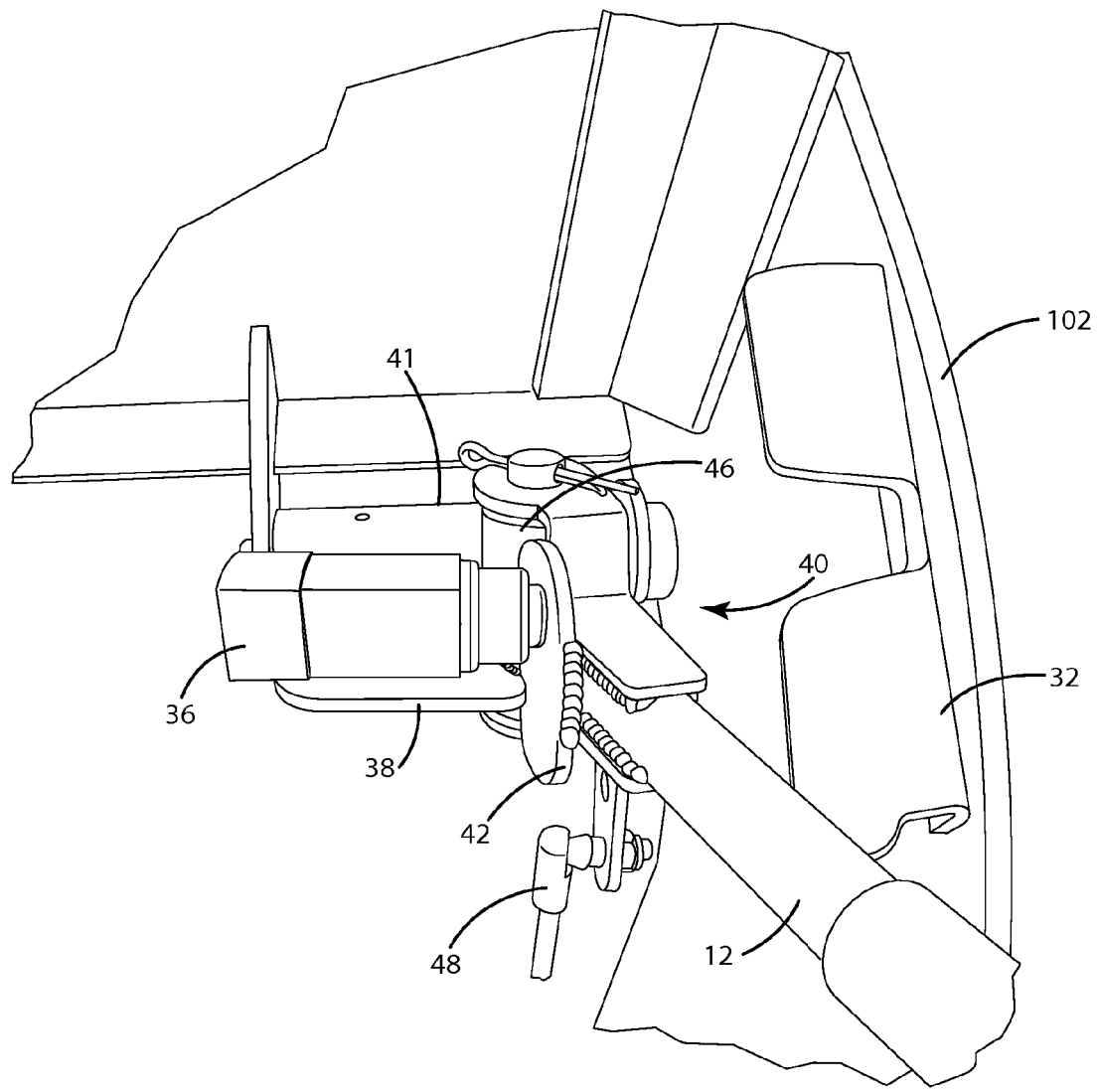
FIG. 8 is a partial perspective view of the operator control construction shown in FIG. 7 without a vehicle shroud.
Figure 9:
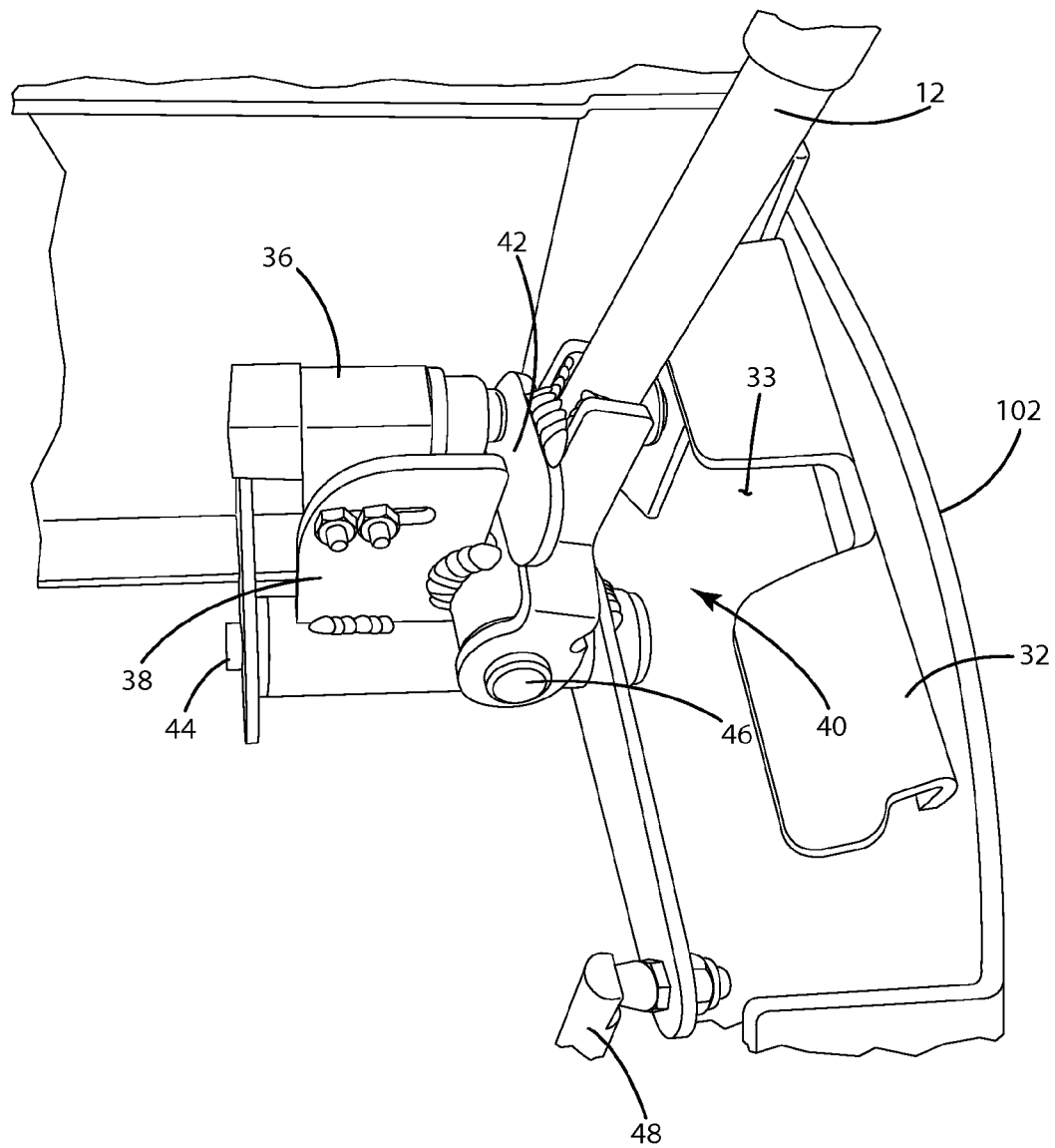
FIG. 9 is a partial perspective view of the operator control shown in FIG. 7 without the vehicle control cover.
Figure 10:
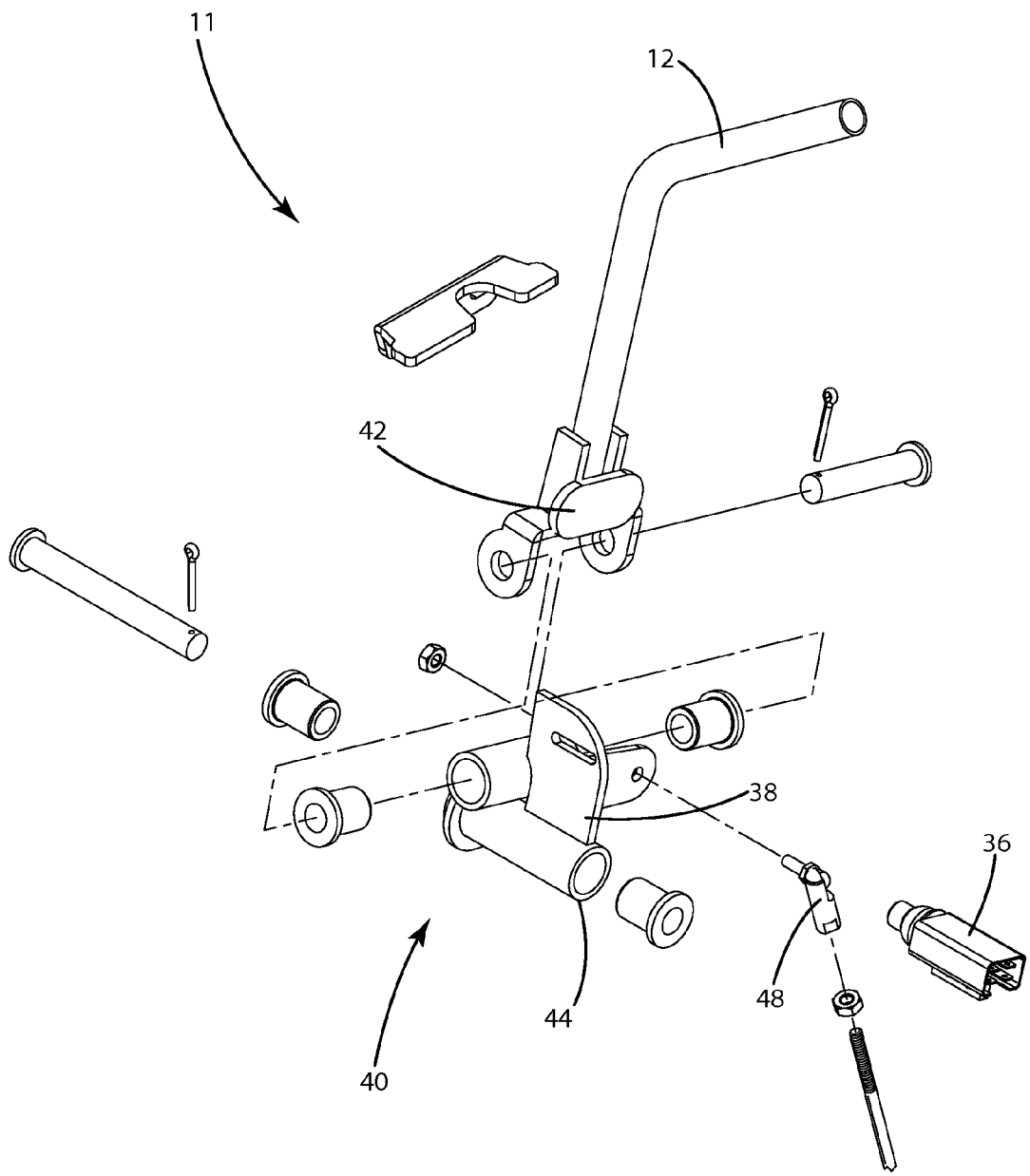
FIG. 10 is an exploded view depicting the portion of the operator control shown in FIG. 6.

In the illustrated embodiments of FIGS. 6 and 7, a right control assembly 11 including the right control lever 12 and associated construction are shown in further detail. FIGS. 8 and 9 depict the same embodiment but without the vehicle shroud 102 to aid in understanding. It should be understood that the left control assembly, including the left control lever 14 and associated construction, may be similar in construction and operation but mirrored. The right control lever 12 is shown in a lockout position in the illustrated embodiment of FIG. 6, and in a drive position in the illustrated embodiment of FIG. 7. In both instances, the right control lever 12 is in the neutral position. However, in the drive position, the right control lever 12 may be capable of being moved forward and back from the neutral position. In the illustrated embodiment, in the lockout position, the right control lever 12 is prevented from moving out of the neutral position due to the recesses 33, 35.

In one embodiment, depicted in FIGS. 6, 7, 9 and 10, the right control assembly 11 may include the right neutral centering bracket 32 with the recess 33, a control stop 38, a control bracket 40, a control plate 42, a forward/reverse pivot 44, a lateral pivot 46, a drive linkage 48, and a right control switch 36. The control stop 38 may be fixed to the forward/reverse pivot 44, and the control plate 42 may be fixed to the lateral pivot 46, which may enable lateral rotation of the right control lever 12 between the lockout position and the drive position. In the drive position, the control plate 42 may contact the control stop 38 to aid the vehicle operator in maintaining the right control lever 12 in the drive position. The forward/reverse pivot 44 may be coupled to the drive linkage 48, and may enable the right control lever 12 to pivot forward and backward to and from the neutral position and couple such movement to the hydrostatic drive via the drive linkage 48. In this way, the vehicle operator can move the right control lever 12 to control operation of the vehicle 100. The control bracket 40 may couple the right control assembly 11 to the vehicle frame.

The right neutral centering bracket 32, as described above, may accept or receive the right control lever 12 within the recess 33 such that, when received, the right control lever 12 is in a lockout position in which forward and backward movement from the neutral position is substantially prevented. To move the right control lever 12 from the lockout position to the drive position, the vehicle operator may pivot the right control lever 12 about the lateral pivot 46 and inwardly toward the control stop 38 until the control plate 42 contacts the control stop 38. In the drive position, the right control lever 12, as outlined above, may be capable of pivoting about the forward/reverse pivot 44, translating forward or reverse motion to changes in operation of the hydrostatic drive. In the illustrated embodiment, spring returns are coupled to both the forward/reverse pivot 44 and the lateral pivot 46. The spring return coupled to the forward/reverse pivot 44 may aid in returning the right control lever 12 to the neutral position, particularly in the case where no vehicle operator is actively controlling or grasping the right control lever 12. The spring return coupled to the lateral pivot 46 may aid in returning the right control lever 12 to the lockout position. For example, in response to a vehicle operator releasing the right control lever 12, the spring coupled to the forward/reverse pivot 44 may influence the right control lever 12 toward the neutral position, at which point the spring return coupled to the lateral pivot 46 may influence the right control lever 12 toward the lockout position.

In the illustrated embodiment, the right control assembly 11, as mentioned above, may include a right control switch 36. The right control switch 36 may form part of the electronic control system 200, and provide one or more control signals indicative of the position of the right control lever 12. For example, the right control switch 36 may provide (a) a lockout control signal indicative of whether the right control lever 12 is in the lockout position, and (b) a drive control signal indicative of whether the right control lever 12 is in the drive position. In one embodiment, the right control switch 36 may be a limit switch having two contacts, one being normally closed and associated with the lockout control signal, and the other being normally open and corresponding to the drive control signal.

As can be seen in the illustrated embodiment of FIG. 6, an actuator of the right control switch 36 is extended in the lockout position. With the actuator being extended, the two contacts of the right control switch 36 are in their normal positions such that the contact associated with the lockout control signal is closed, and the contact associated with the drive control signal is open. Accordingly, if the right control lever 12 is in the lockout position, the right control switch 36 provides a closed circuit path for the lockout control signal, and an open circuit path for the drive control signal.

In the illustrated embodiment of FIGS. 6 and 7, in response to the right control lever 12 being actively pivoted toward the drive position by the vehicle operator, the actuator of the right control switch 36 may be forced by the control plate 42 to actuate the right control switch 36. In the illustrated embodiment, upon activation of the right control switch 36, the contact associated with the lockout control signal is opened, and the contact associated with the drive control signal is closed. Accordingly, if the right control lever 12 is in the drive position, the right control switch 36 provides an open circuit path for the lockout control signal, and a closed circuit path for the drive control signal. These outputs are opposite the outputs provided while the right control lever 12 is in the lockout position. As can be seen in FIGS. 6 and 7, the control plate 42 provides a point of contact for a control switch on both sides of the right control lever 12. In this way, the construction of the right control lever 12 and the left control lever 14 may be the same. For example, with left control assembly mirroring the right control assembly, including the control switch 36 and its attachment to the control stop 38, the same control lever construction depicted in the illustrated embodiment of FIG. 6 may be used in either the left or right control assemblies.

As described herein, the right control switch 36 may be interlocked with or coupled to a left control switch 37, which is similar to the right control switch 36, and operates in a similar manner with respect to the position of the left control lever 14. For example, in the illustrated embodiment, the lockout control signal may be provided through the right control switch 36 and the left control switch 37 only while both the right and left control levers 12, 14 are in the lockout position. The contacts associated with the drive control signal may be open in the lockout position such that the drive control signal is not present. Likewise, a drive control signal may be provided through the right control switch 36 and the left control switch 37 only while both the right and left control levers 12, 14 are in the drive position.

In an interlocked configuration in which the right and left control switches 36, 37 are interlocked, if either the right control lever 12 or the left control lever 14 is in a different position than the other (e.g., one in the lockout position and the other in the drive position), the circuit paths for both the lockout control signal and the drive control signal may be open. In this way, vehicle operations may be prevented or enabled only while both the right and left control levers 12, 14 are in the same position. For example, starting of the vehicle may be prevented unless both the right and left control levers 12, 14 are in the lockout position such that the right and left control switches 36, 37 provide a closed circuit path for the lockout control signal, thereby substantially preventing engine start while one or both of the right and left control levers 12, 14 are improperly disposed in the drive position.

Figure 11:
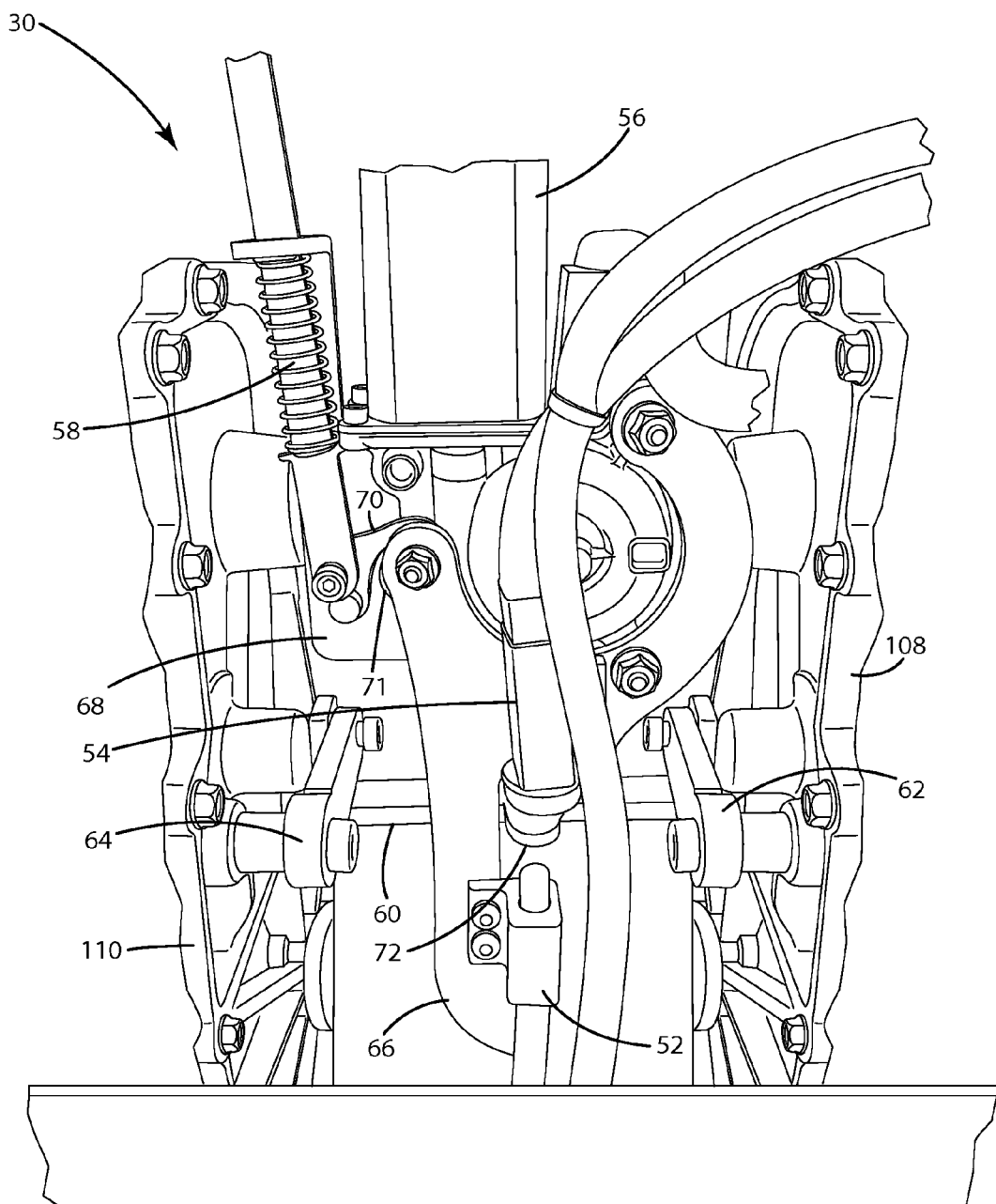
FIG. 11 is a perspective view of a brake assembly and control sensor(s) of a vehicle according to one embodiment of the present invention.
Figure 12:
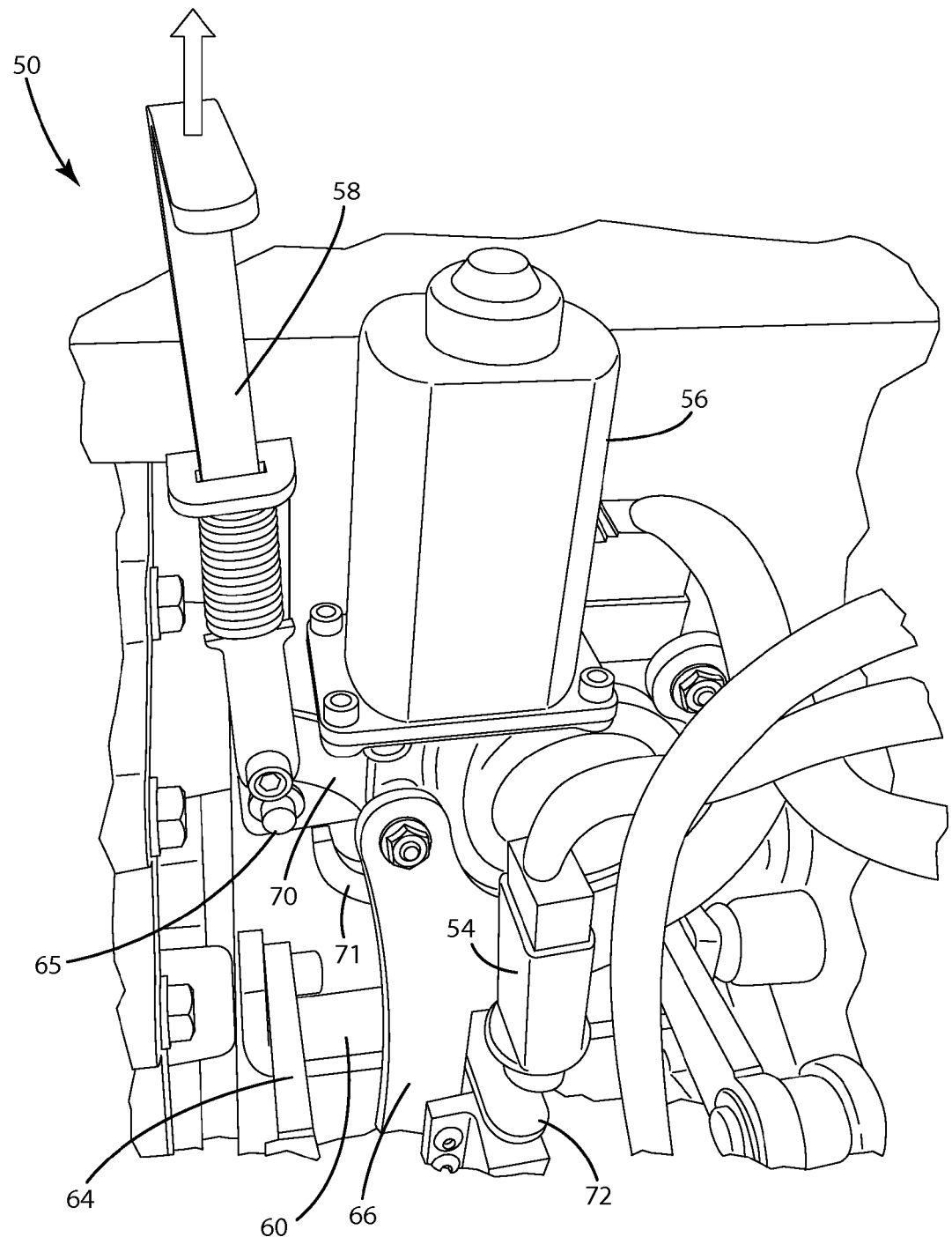
FIG. 12 is another perspective view of the brake assembly and control sensor(s) of the vehicle, showing a manual brake release in an actuated position.
Figure 13:
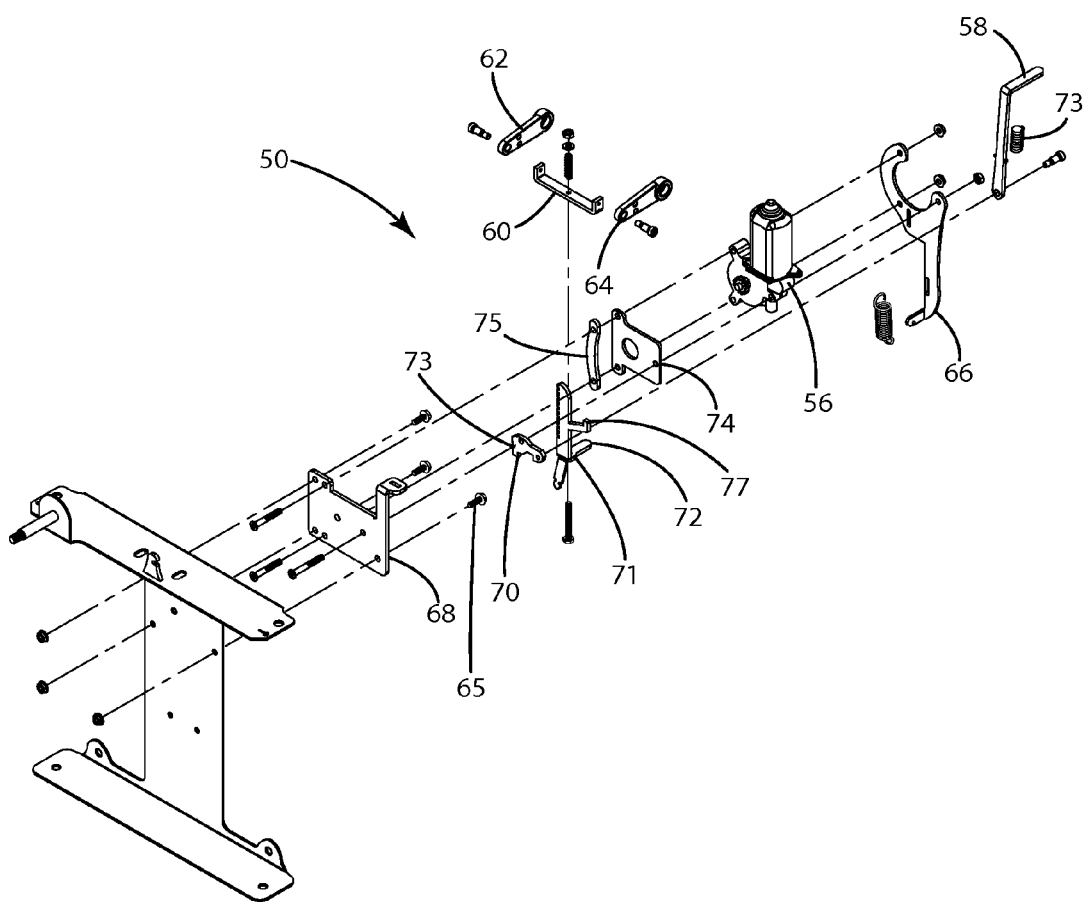
FIG. 13 is an exploded view depicting the brake assembly of the vehicle.

Turning now to the illustrated embodiment of FIGS. 11-13, the brake control assembly of the vehicle 100 is shown, and generally designated 50. The brake control assembly 50 may control engagement and disengagement of each brake (not shown) of the two hydrostatic transaxles 108, 110. In the illustrated embodiment, the right and left hydrostatic transaxles 108, 110 include, respectively, a hydrostatic brake arms 62, 64. Rotation of the hydrostatic brake arms 62, 64 in one direction to a brake engagement point may result in engagement of the brakes within the hydrostatic transaxles 108, 110. Conversely, rotation of the hydrostatic brake arms 62, 64 in the other direction to a brake disengagement point may result in disengagement of the brakes.

In the illustrated embodiment, the brake control assembly 50 may include a brake backing plate 68 affixed to a frame portion of the vehicle 100. The brake control assembly 50 also may include a brake lever arm 60 that couples a brake gear rack 71 to the hydrostatic brake arms 62, 64, and aids in translating linear movement of the brake gear rack 71 to rotation of the hydrostatic brake arms 62, 64. It should be understood that the present invention is not limited to the brake control assembly 50 described herein, and that any type of actuator or control assembly may be implemented to control engagement and disengagement of the brakes of the hydrostatic transaxles, or any type of brakes implemented in connection with the vehicle 100.

Linear motion of the brake gear rack 71 may be controlled by an electric motor 56 having a pinion gear that interfaces with the rack or linear gear of the brake gear rack 71. As described herein, the electronic control system 200 may control operation of the electric motor 56 (e.g., forward or reverse) to move the linear gear rack 71 to and from brake engagement and disengagement positions, and to maintain position of the linear gear rack 71 in the brake engagement or disengagement positions. As depicted in FIG. 11, the linear gear rack 71 is retracted upward along the plane of the page, and in a brake engagement position. In FIG. 12, the linear gear rack 71 is extended downward along the plane of the page, and in a brake release position.

In the illustrated embodiments of FIGS. 11 and 12, a lower brake control switch 52 and an upper brake control switch 54 are coupled to a switch mounting plate 66, which itself may be mounted in a fixed position to the brake backing plate 68. The linear gear rack 71 may include a switch control plate 72 disposed to contact actuators of the lower and upper brake control switches 52, 54 depending on the position of the linear gear rack 71, and therefore the position of the hydrostatic brake arms 62, 64.

The lower brake control switch 52 and the upper brake control switch 54 may provide a control signal or complete a circuit path for a control signal under various conditions, such as when the brake is engaged or disengaged. Both the upper and lower brake control switches 54, 52 may be limit switches. It should be understood that the present invention is not limited to the specific configuration of control switches depicted and described in connection with the illustrated embodiments of FIGS. 11 and 12. Any type of control switch or sensor may be incorporated into the brake control assembly to sense if the brake is engaged or if the brake is disengaged, or both.

In one embodiment, the upper brake control switch 54 may be a limit switch having two contacts, one being normally open and associated with an engine start signal, and the other being normally closed and associated with a brake engaged signal. In the illustrated embodiment, both contacts receive the lockout control signal provided by the right and left control switches 36, 37. The lower brake control switch 52 may be a limit switch having one contact associated with a brake disengagement signal. In the illustrated embodiment, the contact of the lower brake control switch 52 receives the drive control signal provided by the right and left control switches 36, 37.

More specifically, with the linear gear rack 71 in the up position, or the brake engagement position, the actuator of the upper brake control switch 54 may be depressed by the switch control plate 72. With the actuator depressed, the contact associated with the brake engage signal may be open such that no output is present regardless of whether the lockout control signal is present. And, with the actuator depressed, the contact associated with the engine start signal may be closed such that if the lockout control signal is present or active (e.g., the right and left control levers 12, 14 are in the lockout position), the engine start enable signal is also present or active. In the brake engagement position, the switch control plate 72 may be positioned so that an actuator of the lower brake control switch 52 is extended. This way, the contact associated with the brake disengagement signal is closed such that the brake disengagement signal may be active if the drive control signal is present or active.

In describing a control signal as being present or active in the context of the illustrated embodiment, the control signal is considered a power source or "hot" such that power is available to activate an input or device coupled to the control signal. It should be understood however that one or more of the control signals described herein may be configured differently. For example, a control signal may sink power rather than source power in an active state. As another example, the control signal may interface with a device or input indirectly via separate driver or controller.

In the illustrated embodiment, with the linear gear rack 71 in the down position, or the brake disengagement position, the actuator of the upper brake control switch 54 may be extended. In this configuration, the contact associated with the brake engage signal may be closed such that the brake engage signal is active if the lockout control signal is present or active. As a result, if the vehicle operator releases or allows the left and right control levers 12, 14 to seat in the lockout position (also the neutral position), thereby resulting in the lockout control signal becoming active, the brake engage signal will be active and brake engagement will occur.

With the brake control assembly 50 in the brake engagement position, the contact of the upper brake control switch 54 that is associated with the engine start enable signal may be open such that no output is present or active regardless of whether the lockout signal is present. This configuration, as described herein, may prevent the engine from starting unless (a) the brake lever arm 60 is in the brake engagement position, and (b) the right and left control levers 12, 14 are in the lockout position and neutral positions.

With the linear gear rack 71 in the down position, or the brake disengagement position, the actuator of the lower brake control switch 52 may be depressed by the switch control plate 72. Accordingly, the contact of the lower brake control switch 52, which is a normally closed contact in the illustrated embodiment, may be open such that the brake disengagement signal is not present or active regardless of whether the drive signal is present. In practical terms, this means that, in the illustrated embodiment, the brake disengagement signal may be active only while (a) the brakes are not disengaged and (b) the right and left control levers 12, 14 are in the drive position (e.g., being actively held by the vehicle operator in the drive position). This way, brakes of the hydrostatic drives can be prevented from disengagement unless the vehicle operator is presently and actively operating the right and left control levers 12, 14 in the drive position.

In the illustrated embodiments of FIGS. 11-13, the brake control assembly 50 includes a manual brake release 58 that may enable a vehicle operator to manually transition the brakes of the hydrostatic drives from being engaged to disengaged. As described herein, if the vehicle ignition switch 20 is in a state in which the vehicle 100 is powered, manual movement of the brake release lever 58 may result in the electronic control system 200 overriding any such manual movement. For example, if the lockout control signal is present and the drive control signal is therefore not present (e.g., the right and left control levers 12, 14 are in the lockout positions), the brake engagement signal output from the upper brake control switch 54 may become active in response to any manual attempts to manually transition the brakes to a disengaged position. In other words, manually moving the brake lever arm 60 to try to disengage the brakes may activate the brake engagement signal to instruct the brake motor 56 to re-engage the brake.

The manual brake release 58, as depicted in the illustrated embodiments of FIGS. 11-13, may be coupled to a brake cam 70 that is configured to rotate in response to linear movement of the manual brake release lever 58. The brake cam 70 may include a cam tooth 73 that actuates a brake release lever arm 77 of the brake gear rack 71 in response to the manual brake release 58 being moved linearly upward as depicted in FIG. 12. The brake cam 70 may rotate and interface with a stop 65. As the manual brake release 58 is moved linearly upward, the cam tooth 73 may rotate downward applying force on the brake release lever arm 77, and manually pulling the brake gear rack 71 out of engagement with the pinion gear of the electric motor 45. With the brake gear rack 71 in this position, a spring coupled to an end of the brake gear rack 71 can pull the brake gear rack 71 downward into a brake disengagement position. In this state, if the manual brake release 58 is moved linearly downward, the cam tooth 73 rotates upward and enables the brake gear rack 71 to re-engage the pinion gear of the electric motor 45. In one embodiment, if the vehicle 100 is not powered, the brake gear rack 71 may remain in position after the manual brake release lever 58 is actuated, leaving the brakes disengaged. However, if the vehicle 100 is powered, as mentioned herein, the electronic control system 200 may automatically return the brake gear rack 71 to the brake engagement position. It should be understood that the present invention is not limited to the specific manual brake release configuration described herein, and that a variety of alternatives may be utilized.

To facilitate construction and operation of the manual brake release 58, the brake assembly 50 may include a release spring 73 for stabilizing the manual brake release 58, a cam cover plate 74, and brake spacer plate 75. The cam cover plate 74 may shield, wholly or partially, the brake cam 70 and the brake release lever arm 77 of the brake gear rack 71 to enhance protection against interference, such as interference from debris or other external objects. The brake spacer plate 75 may space the cam cover plate 74 from the brake backing plate 68, providing space for the brake cam 70 and the brake gear rack 71 to move.

Turning now to the illustrated embodiment of FIG. 14, the electronic control system 200 will now be described in further detail. The electronic control system 200 may include a control module with the right and left control switches 36, 37 and a brake control system with the lower and upper brake control switches 52, 54. The electronic control system 200 may further include a motor control module 84. For purposes of disclosure, the illustrated embodiment is described in connection with the motor control module 84 being a motor reversing module. It should be understood that any type of motor control module 84 may be used in conjunction with one or more embodiments described herein, and that the present invention is not limited to a motor reversing module.

The electronic control system 200 may include a vehicle start module with a starter relay 82 capable of providing an start signal to the engine via an engine connector 88. The ignition switch 20 described in connection with the illustrated embodiments of FIG. 2 may be coupled to the electronic control system 200 via an ignition switch connector 86. Likewise, the electric motor 56 that controls movement of the brake gear rack 71 (and therefore capable of engaging and disengaging the brakes in one embodiment) may be coupled to the electronic control system 200 via an electric motor connector 90. The connectors in the illustrated embodiment are reusable, detachable connectors that may facilitate maintenance. In an alternative embodiment, one or more of the connectors may be replaced with directed connections or any other type of electrical connection to the electronic control system 200.

Figure 14:
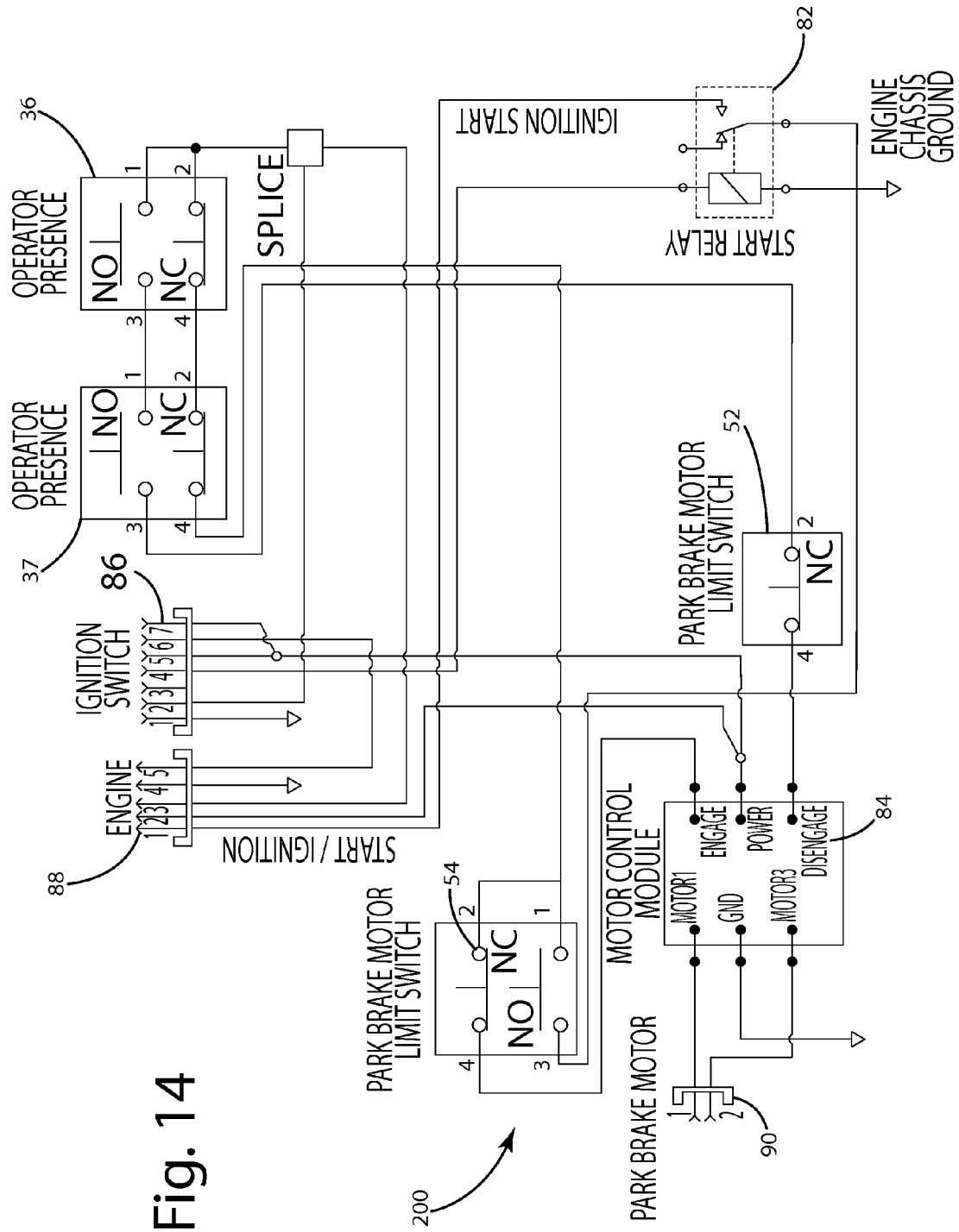
FIG. 14 is a representative circuit diagram of an integrated control system according to one embodiment of the present invention.

In the illustrated embodiment of FIG. 14, for purposes of disclosure, the normally open contacts of the right control switch 36, left control switch 37, and upper brake control switch 54 are identified by nodes 1 and 3, where node 1 is an input and node 3 is an output. And, the normally closed contacts of these control switches 36, 37, 54 are identified by nodes 2 and 4, where node 2 is an input and node 4 is an output. The normally closed contact of the lower brake control switch 52 is identified by nodes 2 and 4, where node 2 is an input and node 4 is an output. It should be understood that the control switches may be configured differently, and that this terminology is used primarily to facilitate understanding.

In the illustrated embodiment, as generally described in connection with the illustrated embodiments of FIGS. 1-13, the normally open contacts of the right and left control switches 36, 37 may operate to provide the drive control signal. These normally open contacts may provide an open circuit while the right and left control levers 12, 14 are in the lockout and neutral positions, and may provide a closed circuit while the right and left control levers 12, 14 are in the drive position (and also possibly at in a neutral, forward or reverse position). With specific reference to the illustrated embodiment of FIG. 14, power is coupled to the right control switch 36 at input 1, and the right and left control switches 36, 37 are connected in series such that the drive control signal or output 3 of the left control switch 37 may be active only while both the right and left control levers 12, 14 are in the drive position. In any other position, such as while one or both of the right and left control levers 12, 14 are in the lockout position, the drive control signal or output 3 of the left control switch 37 may be inactive.

The normally closed contacts of the right and left control switches 36, 37 may operate to provide the lockout control signal. These normally closed contacts may provide an open circuit while the right and left control levers 12, 14 are in the drive position, and may provide a closed circuit while the right and left control levers 12, 14 are in the lockout and neutral positions. Power may be coupled to the right control switch 36 at input 2, and the lockout control signal may be output from the left control switch 37 at output 4. While both the right and left control levers 12, 14 are in the lockout and neutral positions, the lockout control signal or the output 4 of the left control switch 37 may be active. In any other position, such as while one or both of the right and left control levers 12, 14 are in the drive position, the lockout control signal or output 4 of the left control switch 37 may be inactive.

In the illustrated embodiment, the upper and lower brake control switches 54, 52 may operate to provide control signals to the motor control module 84 and the starter relay 82. The control signals output from the upper and lower brake control switches 54, 52 may depend on control signals received from other components of the electronic control system 200. For example, the control signals output from the upper brake control switch 54 may depend on the state of the lockout control signal provided by the right and left control switches 36, 37, and the control signal output from the lower brake control switch 52 may depend on the state of the drive control signal provided by the right and left control switches 36, 37.

The normally closed contact of the upper brake control switch 54 may provide the brake engagement signal at output 4 while the lockout control signal is present at input 2 and while the brakes are disengaged. The brake engagement signal may be provided to the motor control module 84, directing the motor control module 84 to engage the brakes of the hydrostatic drive. Because the output 4 of the upper brake control switch 54 is tied to a normally closed contact, as long as the lockout control signal is present at input 2, the brake engagement signal may be present at output 4. After the brakes engage, and the switch control plate 72 of the linear gear rack 71 depresses the actuator of the upper brake control switch 54, output 4 and the brake engagement signal may deactivate so that the motor control module 84 is no longer directed to drive the motor 56 to engage the brakes. However, as mentioned above, if the lockout control signal remains present, and the brakes in any way become disengaged (e.g., by manipulating the manual brake release 58), the brake engagement signal may be active such that the motor control module 84 is directed to drive the motor 56 to engage or reengage the brakes. With this configuration, the electronic control system 200 may engage the brakes of the hydrostatic drive and keep them engaged if the vehicle operator is not actively grasping the left and right control levers 12, 14 and therefore considered not present. If the vehicle operator is actively grasping the left and right control levers 12, 14, and the levers are not in the lockout position, the lockout control signal may not be active, and therefore the electronic control system 200 may not attempt to engage the brakes. In this way, the vehicle 100 including the electronic control system 200 may implement a form of operator presence detection or automatic brake engagement, or both, based on one or more conditions of the operator control (e.g., the right and left control levers 12, 14).

The normally open contact of the upper brake control switch 54 may provide the engine start enable signal at output 3 while the lockout control signal is present at input 1 and while the brakes are engaged. The engine start enable signal may be provided to the starter relay 82, which, as depicted in the illustrated embodiment, is provided directly to the engine via connector 86 in response to the starter relay 82 being activated by an engine start signal from the ignition switch 20. It should be understood that the present invention is not limited to this configuration, and that the engine start signal and starting of the engine may be implemented differently depending on the application.

Operation of the normally open contact and output 3 of the upper brake control switch 54 may enable starting of the engine only while the brakes are engaged (e.g., the linear gear rack 71 is in the up position), and while the lockout control signal is present. With the lockout control signal being present, the electronic control system 200 may consider the right and left control levers 12, 14 to be in both the lockout and neutral positions. The electronic control system 200 may prevent or disable starting of the engine if (a) the lockout control signal is not present at input 1 of the upper brake control switch 54 or (b) the actuator of the upper brake control switch 54 is not depressed by the switch control plate 72 such that the normally open contact provides a closed circuit path between input 1 and output 3. Accordingly, starting of the engine may be disabled if the electronic control system 200 considers the vehicle 100 to be in a drive state, a state other than neutral, or the brakes to be disengaged, or a combination thereof. In this way, the vehicle 100 may implement a neutral lockout based on one or more conditions of the operator control (e.g., the right and left control levers 12, 14.)

In the illustrated embodiment, the normally closed contact of the lower brake control switch 52 may operate to provide a control signal to the motor control module 84 to command the motor control module 84 to disengage the brakes of the hydrostatic drive. The brake disengagement signal provided by output 4 of the lower brake control switch 52 may be present or active while (a) the brake is not considered to be disengaged, and (b) both the right and left control levers 12, 14 are in the drive position (e.g., the drive control signal is active from the right and left control switches 36, 37). If the brakes are or become disengaged such that the normally closed contact of the lower brake control switch 52 provides an open circuit, the brake disengagement signal may not be present to command the motor control module 84 to disengage the brakes. For example, if the switch control plate 72 is in the up position (and the brakes are therefore not engaged) and the drive control signal is present, the lower brake control switch 52 at output 4 provides the brake disengagement signal to command the motor control module 84 in order to drive the motor 56 to disengage the brakes. Once the switch control plate 72 actuates the lower brake control switch 52, the normally closed contact may be an open circuit such that the brake disengagement signal is not present regardless of whether the drive control signal is present. In this way, in the illustrated embodiment, the brakes of the hydrostatic drive may be disengaged only in response to the right and left control levers 12, 14 being positioned in the drive position. This operation may be considered a form of operator presence detection, possibly preventing the vehicle from being driven (e.g., maintaining engagement of the brakes) unless an operator is considered present.

As outlined above, another form of operator presence detection may engage the brakes if the right and left control levers 12, 14 are not being actively controlled by a vehicle operator. In other words, if the right and left control levers 12, 14 are allowed to automatically return to the neutral and lockout position (e.g., in response to a vehicle operator releasing them), the lockout control signal may be active. In this circumstance, if the brakes are not engaged, the upper brake control switch 54 may activate the brake engagement signal to engage the brakes. In the illustrated embodiment, operator presence detection may be accomplished by engaging the brakes based on a operator control not being actively controlled by a vehicle operator, and disengaging the brakes based on the operator control being actively controlled.

Figure 15:
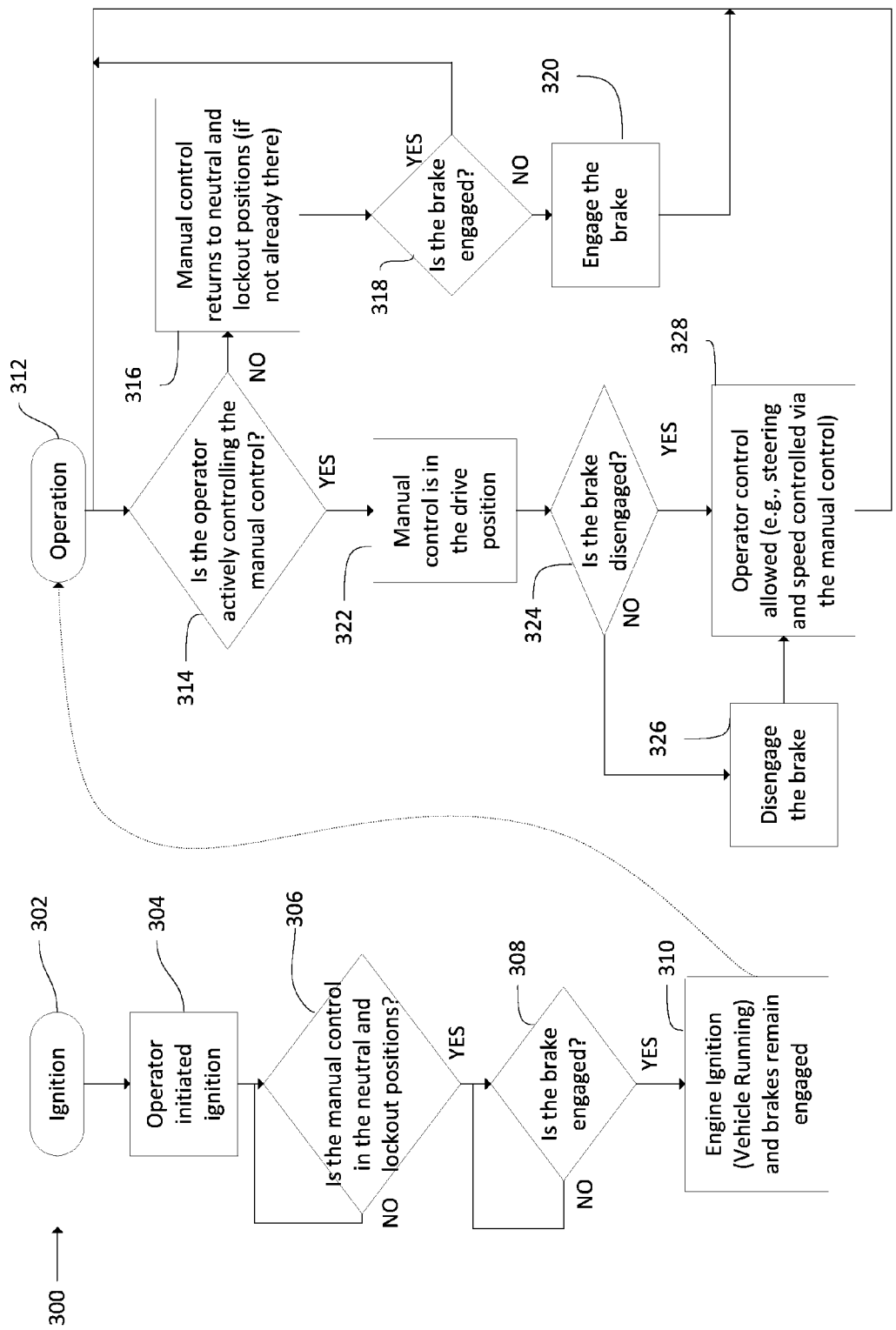
FIG. 15 is a method of operation according to one embodiment of the present invention.

A method of operation according to one embodiment of the present invention will now be described in connection with FIG. 15, and is generally designated 300. The method 300 may be implemented in a vehicle 100 configured according to one to one or more of the embodiments described herein. For purposes of disclosure, the method 300 is described in connection with the vehicle 100 configured according to one or more embodiments described herein. For example, the method 300 may be implemented on a vehicle 100 having an operator control capable of being actively controlled by a vehicle operator, and a sensor capable of sensing whether the operator control is being actively controlled. It should be understood that the operator control may be the right and left control levers 12, 14, and that the sensor may include one or more of the right and left control switches 36, 37. However, the method 300 may be implemented in connection with any other type of control and sensor configuration suitable for implementation on a vehicle 100.

The method 300 is also described in connection with sensors for determining whether the brake is engaged or disengaged. It should be understood that these sensors may be the lower and upper brake control switches 52, 54 described in connection with the illustrated embodiment of FIGS. 10-14. However, the present invention is not limited to this configuration; any type of sensor configuration capable of determining status of the brake may be used.

In the illustrated embodiment, the vehicle engine remains off until the starting process 302 is initiated. Step 304. Although not shown, prior to initiating starting, vehicle power may be present or absent depending on whether the ignition switch connects vehicle power to the electronic control system 200. As described herein, if vehicle power is present, operation according to process 312 may ensure the brake remains engaged if the vehicle operator is not actively controlling the operator control.

With the ignition switch being activated to start the engine, the starting process 302 may start the engine only while (a) the operator control is in the neutral position or lockout position, or both and (b) the brake is engaged. Steps 306, 308, 310. This may provide neutral lockout functionality based on the status of the operator control. Confirming brake engagement in step 308 may ensure that the brake and electronic system is operating correctly, and may enhance safe operation of the vehicle 100.

As mentioned herein, regardless of whether the vehicle engine is running, if vehicle power is present, the operation process 312 may control engagement/disengagement of the brakes and whether a vehicle operator is allowed to drive the vehicle 100. This way, the brake of the vehicle may be controlled to potentially avoid conditions in which the brake becomes or is disengaged, and the vehicle operator is not present in control of the vehicle 100.

In the illustrated embodiment, the method 300 includes detecting or sensing whether the operator control is being actively controlled by a vehicle operator. Step 314. Active control may include tipping the right and left control levers 12, 14 inward to a drive position as described in connection with the illustrated embodiment of FIGS. 1-13. However, the present invention is not so limited, and may include any type of sensor, such as a touch sensitive capacitive sensor, capable of detecting whether the vehicle operator is actively controlling the operator control. In the illustrated embodiment, if the vehicle operator is not actively controlling the operator control, the operator control automatically returns to a neutral position and a lockout position if not already there. Steps 314, 316. As described in connection with the illustrated embodiments of FIGS. 1-13, this automatic return may include physical movement of the operator control. In an alternative embodiment, a processor or controller may automatically set neutral or lockout conditions, or both, in response to determining the operator control is not being actively controlled by the vehicle operator.

If the operator control is not being actively controlled by a vehicle user (e.g., the vehicle operator is considered to be absent or not present), the brake of the vehicle may be engaged if it is not already engaged. Steps 318, 320. In this way, the brake of the vehicle may be engaged and kept engaged as long as the electronic control system 200 determines the operator control is not being actively controlled. For example, as long as the right and left control levers 12, 14 are in the neutral position or the lockout position, or both, the brake may be engaged. The process 312 may continue to check whether the operator control is being actively controlled. Step 314.

If the vehicle operator desires to initiate movement of the vehicle 100, the vehicle operator may identify his presence and desire by actively controlling the operator control. Steps 314, 322. For example, the vehicle operator may grasp the right and left control levers 12, 14, and position them in the drive position. If both the right and left control levers 12, 14 are positioned in the drive position, the electronic control system 200 may consider the operator control to be actively controlled, and physically in the drive position. In an alternative embodiment, the drive position may be a state identified by a process or controller.

With the operator control being actively controlled by the vehicle operator, the brake may be disengaged, if it is not already disengaged, to enable the vehicle operator to utilize the operator control to command direction and speed of the vehicle. Steps 324, 326, 328. In one embodiment, if the vehicle operator, at any time, is not actively controlling the vehicle, purposefully or unintentionally, the operator control may automatically return to the neutral position or the lockout position, or both, and the brake may be engaged. Steps 314, 316, 318, 320. In this way, operator presence detection may be achieved using the operator control and sensors coupled to the operator control to detect one or more conditions of the operator control, such as active control status and position. Further, the operator control may enable automatic brake engagement/disengagement, and may enable a vehicle operator to direct vehicle operations, such as steering and speed.

Directional terms, such as "vertical," "horizontal," "top," "bottom," "upper," "lower," "inner," "inwardly," "outer" and "outwardly," are used to assist in describing the invention based on the orientation of the embodiments shown in the illustrations. The use of directional terms should not be interpreted to limit the invention to any specific orientation(s).

The above description is that of current embodiments of the invention. Various alterations and changes can be made without departing from the spirit and broader aspects of the invention as defined in the appended claims, which are to be interpreted in accordance with the principles of patent law including the doctrine of equivalents. This disclosure is presented for illustrative purposes and should not be interpreted as an exhaustive description of all embodiments of the invention or to limit the scope of the claims to the specific elements illustrated or described in connection with these embodiments. For example, and without limitation, any individual element(s) of the described invention may be replaced by alternative elements that provide substantially similar functionality or otherwise provide adequate operation. This includes, for example, presently known alternative elements, such as those that might be currently known to one skilled in the art, and alternative elements that may be developed in the future, such as those that one skilled in the art might, upon development, recognize as an alternative. Further, the disclosed embodiments include a plurality of features that are described in concert and that might cooperatively provide a collection of benefits. The present invention is not limited to only those embodiments that include all of these features or that provide all of the stated benefits, except to the extent otherwise expressly set forth in the issued claims. Any reference to claim elements in the singular, for example, using the articles "a," "an," "the" or "said," is not to be construed as limiting the element to the singular.

The embodiments of the invention in which an exclusive property or privilege is claimed are defined as follows:

1. A control system for a vehicle operator to control a vehicle, the vehicle having an operator control and being capable of configuration in a drive mode, a neutral mode, and a lockout mode, the vehicle having a drive system capable of moving the vehicle in the drive mode, the vehicle having a brake system capable of engaging and disengaging a vehicle brake, the vehicle operator controlling the operator control to direct vehicle operations, the control system comprising:
    a control sensor operatively coupled to the operator control, the control sensor being adapted to detect whether the operator control is being actively controlled by the vehicle operator, wherein the lockout mode corresponds to an absence of active control over the operator control, wherein the drive mode corresponds to the operator control being actively controlled by the vehicle operator;
    an automatic return to automatically transition the operator control to the lockout mode and the neutral mode, the automatic return adapted to transition the vehicle to the lockout mode based on absence of active control over the operator control by the vehicle operator;
    a brake control system to control the brake system, the brake control system adapted to engage the vehicle brake based on the control sensor indicating absence of active control over the operator control, the brake control system adapted to disengage the vehicle brake based on the control sensor indicating the operator control is being actively controlled;
    a vehicle starter coupled to the drive system, the vehicle starter adapted to allow starting of the drive system if the control sensor indicates absence of active control over the operator control;
    wherein the operator control includes a first control lever and a second control lever, the first control lever and the second control lever being linked to the drive system to independently control respective first and second drive wheels such that, in the drive mode, the first control lever is adapted to direct the first drive wheel to rotate forward or backward and the second control lever is adapted to direct the second drive wheel to rotate forward or backward;
    wherein the automatic return includes at least one first spring element that, based on absence of operator control over the first control lever by the vehicle operator, directs the first control lever to a first neutral position corresponding to the neutral mode such that the first drive wheel remains substantially motionless;
    wherein the automatic return includes at least one second spring element that, based on absence of operator control over the second control lever by the vehicle operator, directs the second lever to a second neutral position corresponding to the neutral mode such that the first drive wheel remains substantially motionless; and
    wherein the automatic return further independently directs the first and second control levers to a lockout position based on absence of operator control by the vehicle operator, the lockout position corresponding to the lockout mode.

2. The control system of claim 1 further comprising a brake sensor operatively coupled to the vehicle brake, the brake sensor adapted to detect a status of the vehicle brake;
    wherein the status of the vehicle brake includes a brake engagement condition and a brake disengagement condition.

3. The control system of claim 2 wherein the vehicle starter is adapted to allow ignition of the drive system if the control sensor indicates absence of active control over the operator control and the brake engagement condition is present.

4. The control system of claim 2 wherein the brake control system is adapted to disengage the vehicle brake based on the control sensor indicating the operator control is being actively controlled and the brake disengagement condition is absent, wherein the brake control system is adapted to engage the vehicle brake based on the control sensor indicating the absence of active control over the operator control by the vehicle operator and the brake engagement condition being absent.

5. The control system of claim 1 wherein absence of active control over the operator control is defined as the vehicle operator allowing the automatic return to automatically transition the operator control to the lockout mode and the neutral mode.

6. The control system of claim 1 wherein the first and second control levers are adapted to be pivoted toward each other by the vehicle operator to a drive position, the drive position corresponding to the drive mode, wherein, in the drive position, the first and second control levers are adapted to independently pivot substantially parallel to each other to and from the neutral position such that the first and second control levers direct rotation of the first and second drive wheels;
    wherein, in the absence of active control by the vehicle operator, the automatic return is adapted to automatically pivot the first and second control levers to the neutral position and to automatically pivot the first and second control levers away from each other to the lockout position.

7. The control system of claim 6 further comprising first and second lockout brackets disposed on or forming part of the vehicle, each of the first and second brackets having a notch that respectively accepts the first and second control levers in the lockout position, wherein each of the notches effectively prevents the first and second control levers from being pivoted parallel to each other to and from the neutral position such that the first and second control levers are substantially maintained in the neutral position.

8. The control system of claim 1 further comprising a manual brake release operably coupled to the brake control system, the manual brake release adapted to disengage the vehicle brake while the control system is unpowered, wherein the control system, if powered, is adapted to re-engage the vehicle brake despite actuation of the manual brake release.

9. A control system for a vehicle, the vehicle having an operator control and being capable of configuration in a drive mode, a neutral mode, and a lockout mode, the vehicle having a drive system capable of moving the vehicle in the drive mode, the vehicle having a brake system capable of engaging and disengaging a vehicle brake, the vehicle operator controlling the operator control to direct vehicle operations, the control system comprising:
- a control module operatively coupled to the operator control, the control module capable of detecting whether the operator control is being actively controlled by the vehicle operator, the control module adapted to configure the vehicle in the lockout mode based on an absence of active control over the operator control, the control module adapted to configure the vehicle in the drive mode based on the operator control being actively controlled by the vehicle operator;
- a brake control system operatively coupled to the control module, the brake control system adapted to engage the vehicle brake based on the control module indicating absence of active control over the operator control, the brake control system adapted to disengage the vehicle brake based on the control module indicating the operator control is being actively controlled;
- a vehicle starter module coupled to the drive system, the vehicle starter adapted to allow starting of the drive system based on the control module indicating absence of active control over the operator control;
- an automatic return control adapted to automatically transition the operator control to the lockout mode and the neutral mode, the automatic return control adapted to transition the vehicle to the lockout mode based on absence of active control over the operator control by the vehicle operator;
- wherein the operator control includes a first control lever and a second control lever, the first control lever and the second control lever being linked to the drive system to independently control respective first and second drive wheels such that, in the drive mode, the first control lever is adapted to direct the first drive wheel to rotate forward or backward and the second control lever is adapted to direct the second drive wheel to rotate forward or backward;
- wherein the automatic return control includes at least one first spring element that, based on absence of operator control over the first control lever by the vehicle operator, directs the first control lever to a first neutral position corresponding to the neutral mode such that the first drive wheel remains substantially motionless;
- wherein the automatic return includes at least one second spring element that, based on absence of operator control over the second control lever by the vehicle operator, directs the second lever to a second neutral position corresponding to the neutral mode such that the first drive wheel remains substantially motionless; and
- wherein the automatic return control further independently directs the first and second control levers to a lockout position based on absence of operator control by the vehicle operator, the lockout position corresponding to the lockout mode.

10. The control system of claim 9 further comprising a brake sensor operatively coupled to the vehicle brake, the brake sensor adapted to detect a status of the vehicle brake;
wherein the status of the vehicle brakes includes a brake engagement condition and a brake disengagement condition.

11. The control system of claim 10 wherein the vehicle starter is adapted to allow ignition of the drive system if the operator control is configured in the lockout mode by the control module and the brake engagement condition is present.

12. The control system of claim 10 wherein the brake control system is adapted to disengage the vehicle brake if the vehicle is configured in the drive mode and the brake disengagement condition is absent, wherein the brake control system is adapted to engage the vehicle brake if the operator control is configured in the lockout mode and the brake engagement condition is absent.

* * * * *